United States Patent [19]
Yamamoto et al.

[11] Patent Number: 5,339,190
[45] Date of Patent: Aug. 16, 1994

[54] OPTICAL WAVEGUIDE SECOND HARMONIC GENERATING ELEMENT AND METHOD OF MAKING THE SAME

[75] Inventors: Yukihiro Yamamoto; Noriko Yamada, both of Kawasaki, Japan

[73] Assignee: Nippon Steel Corporation, Tokyo, Japan

[21] Appl. No.: 47,183

[22] Filed: Apr. 16, 1993

[30] Foreign Application Priority Data

| Apr. 16, 1992 | [JP] | Japan | 4-122773 |
| Jun. 5, 1992 | [JP] | Japan | 4-171948 |
| Nov. 27, 1992 | [JP] | Japan | 4-341151 |

[51] Int. Cl.$^5$ ............................................. G02F 1/37
[52] U.S. Cl. ................................. 359/332; 359/328; 385/122
[58] Field of Search ................ 385/122; 372/21, 22; 359/326–332

[56] References Cited

U.S. PATENT DOCUMENTS

| 5,022,729 | 6/1991 | Tamada et al. | 385/122 X |
| 5,157,754 | 10/1992 | Bierlein et al. | 385/122 |
| 5,170,460 | 12/1992 | Arvidsson et al. | 359/332 X |

FOREIGN PATENT DOCUMENTS 2-189527  7/1990  Japan ................................. 359/332

OTHER PUBLICATIONS

Phys. Rev. vol. 127, No. 6, Sep. 15, 1962 J. A. Armstrong et al. pp. 1918–1939.
E. J. Lim, M. M. Fejer, R. L. Byer; Electron, Letter, vol. 25, No. 3, Feb. 2, 1989 pp. 174–175.
C. J. Van der Poel, J. D. Bierlein, J. B. Brown, Appl, Phys. Lett, 57(20), Nov. 12, 1990 pp. 2074–2076.
J. D. Bierlein et al, Apply. Phys. Lett. 50(18), May 4, 1987, pp. 1216–1218.

*Primary Examiner*—John D. Lee
*Attorney, Agent, or Firm*—Pollock, Vande Sande & Priddy

[57] ABSTRACT

An optical waveguide second harmonic generating element comprises a KTP single-crystal substrate sliced at a z-plane, a plurality of polarization reversal areas having spontaneous polarization, whose direction is reversed, and formed periodically along a predetermined direction on the z-plane of the substrate, and a channel waveguide, extending along the predetermined direction across polarization reversal areas, for propagating a light.

7 Claims, 4 Drawing Sheets

FIG. 1
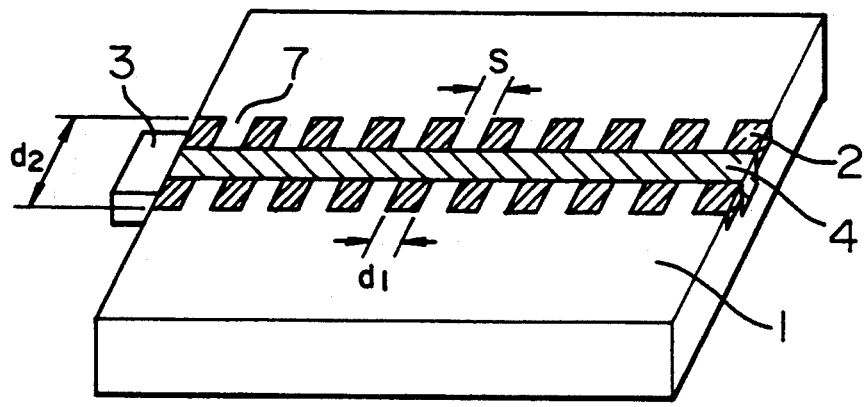
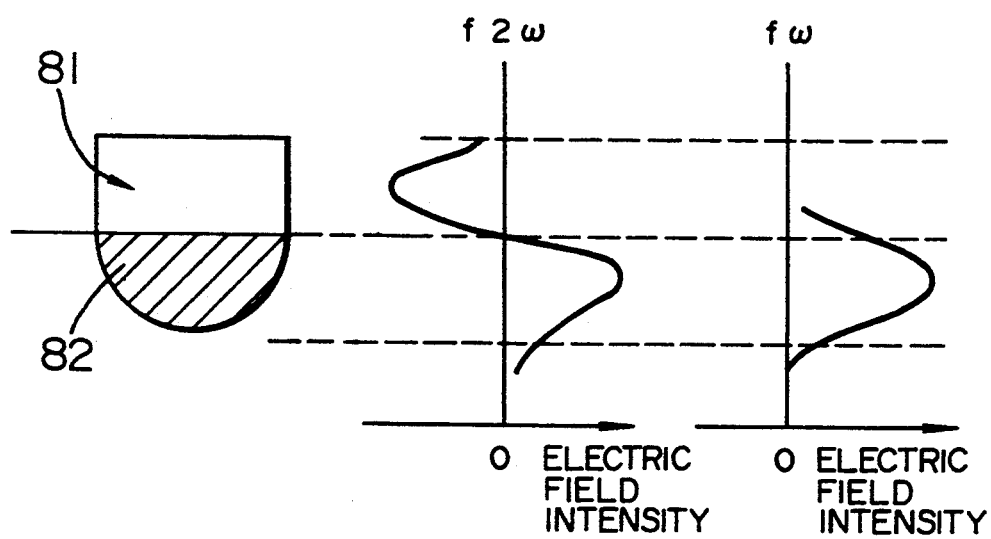
FIG. 3

OPTICAL WAVEGUIDE SECOND HARMONIC GENERATING ELEMENT AND METHOD OF MAKING THE SAME

BACKGROUND OF THE INVENTION

1. Field of the Invention

The present invention relates to an optical waveguide second harmonic generating element (SHG element), and more particularly to a second harmonic generating element suitable for use in a compact laser light source of a short wavelength to be used in fields of optical information processing, optical measurement and medical treatment, and a method of making the same.

2. Description of the Related Art

An oscillation wavelength of a currently practical semiconductor laser is in a range of infrared to red, and a semiconductor laser which oscillates a light of a shorter wavelength, for example, a green or blue wavelength has not yet been put into practice. Accordingly, it has been proposed to generate a second harmonic from an output light of a semiconductor laser, which oscillates an infrared light, thereby to produce a laser beam of a short wavelength.

In order to efficiently convert a wavelength of a light to a second harmonic, it is necessary to meet a phase matching condition so that phases of a number of second harmonics generated at various points in the SHG element match each other. To this end, methods of using angular phase matching, temperature phase matching or a waveguide have been known. Recently, a quasi-phase matching method using a periodic structure shown, for example, in Phys. Rev. Vol. 127, Sep. 15, 1962, J. A. Armstrong et al. pages 1918–1939 is attracting an attention in the field. In this method, a polarization direction in a crystal is periodically reversed to compensate for phase mismatching between a fundamental wave and a harmonic.

The polarization reversal means the reversal of the polarization direction of a single crystalline dielectric material polarized in a predetermined direction. When applied to an SHG element, it is called a polarization reversal type SHG element.

Various methods have been practiced to attain the polarization reversal. For example, in a lithium niobate (LiNbO$_3$) or (LN) single-crystal, thermal diffusion of a Ti metal is used. In a lithium tantalate (LT) single-crystal, a method of rapid heating after proton exchange is used.

FIG. 6 shows an SHG element in which polarization reversal areas and polarization non-reversal areas are formed alternately in a comb shape in a substrate of LN or LT crystal, and a channel waveguide 20 is formed orthogonally thereto.

In generating a second harmonic, the following relationship exists between power of a fundamental wave (frequency $\omega$) and a power of a second harmonic (frequency $2\omega$)

$$P(2\omega) \propto \{S(n,n,m)\}^2 \times \{P(\omega)\}^2 / W \qquad (1)$$

where $P(\omega)$ and $P(2\omega)$ are powers of the fundamental wave and the second harmonic, respectively, W is a width of the waveguide, $S(n,n,m)$ is a spatial coupling constant representing overlap of electromagnetic field distributions of the fundamental wave and the second harmonic, and n and m are orders of mode of the second harmonic and the fundamental wave, respectively.

$$\{S(n,n,m)\} = \int f^2(n,\omega) \cdot f(m,2\omega) dS \qquad (2)$$

where $f(n,\omega)$ and $f(m, 2\omega)$ are electric field distributions of the fundamental wave and the harmonic, respectively, and S is a cross-section.

In an SHG element which uses the quasi-phase matching by using the lithium niobate (LiNbO$_3$) single-crystal which is one of the proposed SHG element; as disclosed in Electron Lett. Vol. 25, No. 3, Feb. 2, 1989, pages 174–175, by E. J. Lim and M. M. Fejer, a refractive index of an optical waveguide is changed by the generated $P(2\omega)$ because the lithium niobate is weak to light damage so that $P(2\omega)$ does not increase in proportion to the increase of a term $\{P(\omega)\}^2$ in the formula (1) but it tends to saturate. Further, since the refractive index of the optical waveguide changes with time, it is difficult to stabilize $P(2\omega)$ over a long time periods.

In order to solve a drawback of the SHG element which uses lithium niobate, a structure shown in FIG. 5 has been proposed as an SHG element which uses KTP (KTi OPO$_4$) which has been known to be stronger to the light damage by the order of two figures than lithium niobate (Appl. Phys. Lett. Vol. 57, No. 20, Nov. 12, 1990, pages 2074–2076, by C. J. Van der Poel, J. D. Bierlein and J. B. Brown). In FIG. 5, numeral 51 denotes a substrate sliced at a z-plane of a KTP single-crystal, and numeral 52 denotes a Rb ion exchange waveguide made by exchanging a part of K ions by Rb ions. When Ba ions are added during the manufacture of the Rb ion exchanqe waveguide, the direction of spontaneous polarization of the waveguide portion is reversed relative to the bulk or substrate so that the SHG is attained by the quasi-phase matching. However, since the optical waveguide is discontinuous in the structure, a light passes through a bulk crystal portion in which no waveguide is formed when the light propagates from a waveguide portion to a next waveguide portion. Since a light confinement effect disappears in the bulk crystal portion, both the incident beam and the generated second harmonic beam spread. Namely, $P(\omega)$ in the formula (1) attenuates as the light travels. As a result, a power of $P(2\omega)$ as calculated is not attained.

The optical waveguide which uses KTP is also disclosed in Appl. Phys. Lett. Vol. 50, No. 18, May 4, 1987, pages 1216–1218, by J. D. Bierlein et al.

SUMMARY OF THE INVENTION

It is an object of the present invention to provide an optical waveguide second harmonic generating element which efficiently generates a second harmonic while keeping a high power density in an optical waveguide by providing a continuous channel optical waveguide on a KTP substrate which is resistive to light damage.

It is another object of the present invention to provide a method of manufacturing the above optical waveguide second harmonic generating element.

In order to achieve the above object, the optical waveguide second harmonic generating element of the present invention comprises a KTP single-crystal substrate sliced at a z-plane, a plurality of polarization reversal areas periodically formed along a predetermined direction on the z-plane of the substrate and having direction of spontaneous polarization reversed, and a channel waveguide for propagating a light, extending across the plurality of polarization reversal areas along the predetermined direction.

The method of manufacturing the optical waveguide second harmonic generating element of the present invention comprises the steps of forming a pattern mask of a selected metal material on a minus z-plane of a KTP single-crystal substrate such that a plurality of areas exposing a substrate surface are periodically arranged along a predetermined direction, applying ion exchange process to the plurality of exposed areas on the substrate to form a plurality of polarization reversal areas periodically arranged along the predetermined direction, and forming a channel waveguide on the substrate extending across the plurality of areas along the predetermined direction.

In the optical waveguide second harmonic generating element of the present invention, a second harmonic is generated in a phase matched condition by passing a light through areas where directions of spontaneous polarization are alternately reversed. A reversal period $\Lambda$ is given by $$\Lambda = (2m-1) \times 2\pi / \{\beta(2\omega) - (\beta(\omega)\} \quad (3)$$

where $\beta(\omega)$ is a propagation constant of a fundamental wave in the channel optical waveguide, $\beta(2\omega)$ is a propagation constant of an SH wave, and m is a natural number.

The light is tightly confined in the waveguide by generating the second harmonic in the continuous channel optical waveguide. As a result, $P(\omega)$ and $S(n,n,m)$ in the formula (1) are made larger than those in the prior art non-continuous optical waveguide structure, and the SHG is attained efficiently.

BRIEF DESCRIPTION OF THE DRAWINGS

FIG. 1 is a perspective view showing a structure of a second harmonic generating element in accordance with a first embodiment of the present invention, FIG. 3 shows a distribution of an electric field intensity of the second harmonic generating element of the second embodiment of the present invention.

DESCRIPTION OF THE PREFERRED EMBODIMENTS

Figure 2A:
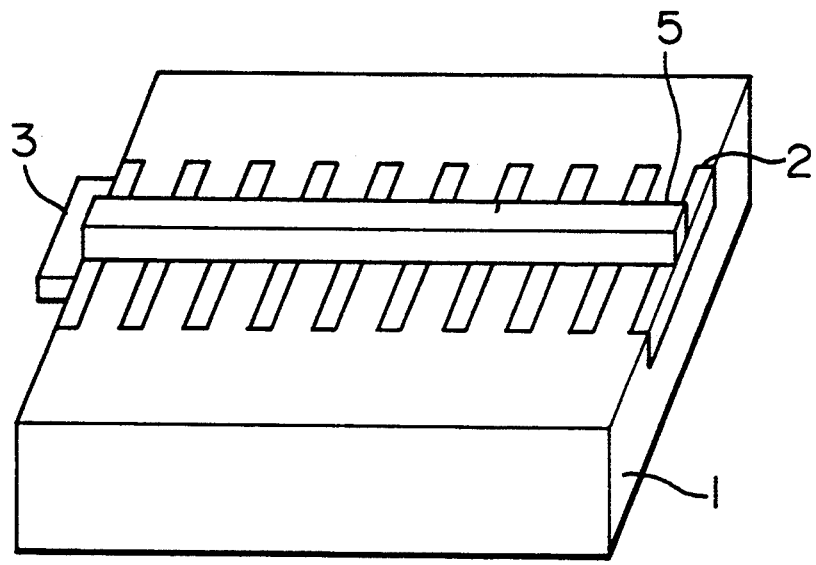
FIG. 2A is a perspective view showing a structure of a second harmonic generating element in accordance with a second embodiment of the present invention.

A second harmonic generating element in accordance with a first embodiment of the present invention is explained with reference to FIG. 1.

In FIG. 1, numeral 1 denotes a z-plate of a KTP single-crystal. Spontaneous polarization reversal areas 2 and non-reversal areas 7 are alternately formed on the z-plane of the single-crystal. An output light of a semiconductor laser 3 is coupled to the KTP single-crystal so that it is directed to an optical waveguide 4. The output light of the semiconductor laser is coupled to the optical waveguide formed on the KTP substrate such that an electric field component which is parallel to the z-direction is formed so that a maximum non-linear optical constant $d_{33} = 14 \times 10^{-12}$ m/v of the KTP is utilized to generate the second harmonic. Assuming that a light having a wavelength of 850 nm is directed, as a fundamental wave, to the optical waveguide 4 from the semiconductor laser 3, a reversal period $\Lambda$ is 3-5 $\mu$m when m=1 in the formula (2). The second harmonic generated in the waveguide is emitted from an end plane of the crystal opposite to the laser incident plane, and may be condensed by a lens as required for other utilization.

The spontaneous polarization reversal areas 2 are formed in the following manner. First, a minus z-plane of a z-plate of a KTP single-crystal having a length of 10 mm, a width of 2 mm and a thickness of 1 mm is covered by a Ti film at areas other than the areas where the direction of the spontaneous polarization is to be reversed by a conventional photolithography technique. Then, the KTP crystal is subjected to thermal treatment at approximately 350° C. for approximately 10 minutes in molten liquid of a mixture of $Ba(NO_3)_2$ and $RbNO_3$ at a ratio of 20/80. As a result, exchange of $Rb^+$ ions by $K^+$ ions is effected in the areas not covered by the Ti film so that the spontaneous polarization reversal areas are formed. After the ion exchanqe, the Ti film is removed by etching. Each reversal area may have a length d1 of approximately 2 $\mu$m, in a light propagation direction, an orthogonal width d2 of approximately 4 $\mu$m to 1 mm and a depth of approximately 3 $\mu$m and a spacing between the reversal areas is about 2 $\mu$m.

The optical waveguide 4 is also formed by the ion exchange in the same manner as the spontaneous polarization reversal areas. First, areas other than an area on which the waveguide is to be formed are covered by a Ti film. Then, it is subjected to thermal treatment at approximately 380° C. for approximately 20 minutes in molten liquid of a mixture of $RbNO_3$ and $TINO_3$ at a ratio of 50/50. Since a refractive index increases in the area in which the ion exchange has been effected by the thermal treatment, a continuous channel optical waveguide is formed. A width and a depth of the optical waveguide may be about 4.0 $\mu$m and 4.0 $\mu$m, respectively.

In accordance with the element of the present embodiment, a high power laser beam having a stable short wavelength is attained by generating the second harmonic from the light source such as a semiconductor laser which oscillates a light at wavelength of infrared to red.

In the present embodiment, the molten salt of nitrate of barium and rubidium is used in the manufacture of the spontaneous polarization reversal areas 2 and the optical waveguide 4. Reference is made to Appl. Phys. Lett. Vol. 50, No. 18, page 1216, 1987, by J. D. Bieriein, A. Ferretti, L. H. Brizner and W. Y. Hsu.

Where the nitrate is used, a melting point is as high as 300°-450° C. that the crystal may be cracked or the surface of the crystal is roughened after the manufacture of the optical waveguide, resulting in the necessity of repolishing after the treatment. The toughened surface or the crack of the crystal may be presented and the propagation loss may be reduced by manufacturing the optical wavelength at a lower temperature by using the molten salt of acetate such as rubidium, cesium, talium or barium which melts at a relatively low temperature (its meting point is 194°-246° C., and the melting point of a mixture thereof is approximately 150° C.). An embodiment therefor is described below. The embodiment is applicable to the manufacture of not only the element of FIG. 1 which includes the reversal areas 2 and the optical waveguide 4 but also an element having only the optical waveguide without the reversal areas 2.

Rubidium acetate was put in a pot and melt at 250°–320° C. A z-plate of a KTP single-crystal cut in a z-plane was treated in the molten salt for 10 minutes to 4 hours to form a planar waveguide on the surface. The treated crystal exhibited a smooth surface.

An equivalent refractive index difference was measured by a prism coupling method by a He-Ne laser ($\Lambda$=633 nm). It was 0.0019 for a TM mode on a +Z-plane.

Results of treatments by various salts are shown in Table 1.

TABLE 1

Results of treatments by various salts
(+Z plane, $\lambda$ = 633 nm)

| | Equivalent refractive index difference | Surface Condition | Crack |
|---|---|---|---|
| Example | | | |
| Rubidium acetate | 0.0019 | good | o |
| Cesium acetate | 0.0020 | good | o |
| Thallium acetate | 0.0017 | good | o |
| Mixture of rubidium acetate and barium acetate (Rb 95 mol % + Ba 5 mol %) | 0.0018 | good | o |
| Comparative example | | | |
| Rubidium nitrate | 0.0019 | no good, occasionally broke | x |
| Cesium nitrate | 0.0019 | no good | x |

A second embodiment of the present invention is now explained with reference to FIGS. 2A and 2B.

Figure 2B:
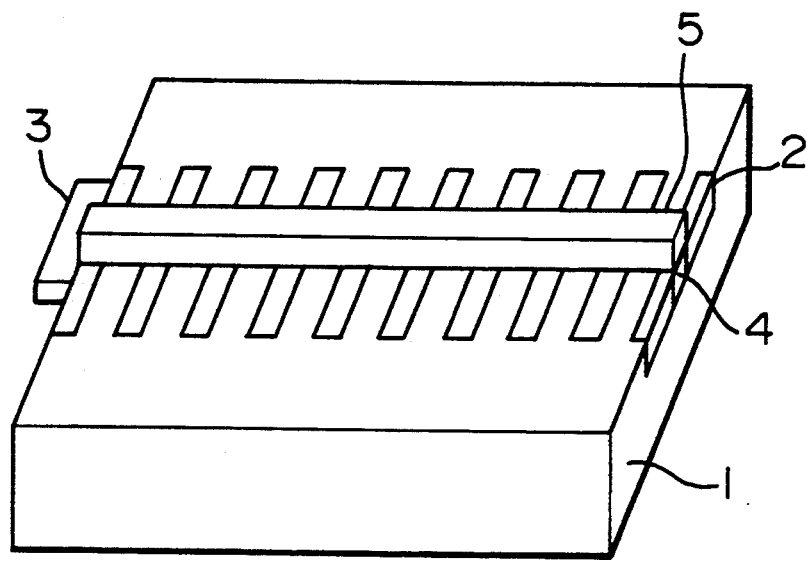
FIG. 2B is a perspective view showing a structure of a modification of the second harmonic generating element of the second embodiment of the present invention.

In the optical waveguide second harmonic generating element of the second embodiment, a ridge optical waveguide 5 having a refractive index which is smaller than that of an optical waveguide area for guiding a second harmonic and larger than that of a KTiOPO$_4$ substrate 1 which is resistive to light damage is formed, as shown FIG. 2A, on a z-plane of the substrate orthogonally to the spontaneous polarization reversal areas 2 as shown in FIG. 2A, or the periodic spontaneous polarization reversal areas 2. Alternatively, as shown in FIG. 2B, a first continuous channel waveguide 4 is formed on the areas 2 for propagating a light in the direction of periodicity and a ridge optical wavelength 5 having a refractive index which is smaller than that of an optical guide area for guiding the second harmonic and larger than that of the substrate is formed to extend in parallel to the first continuous channel waveguide 4.

Figure 4B:
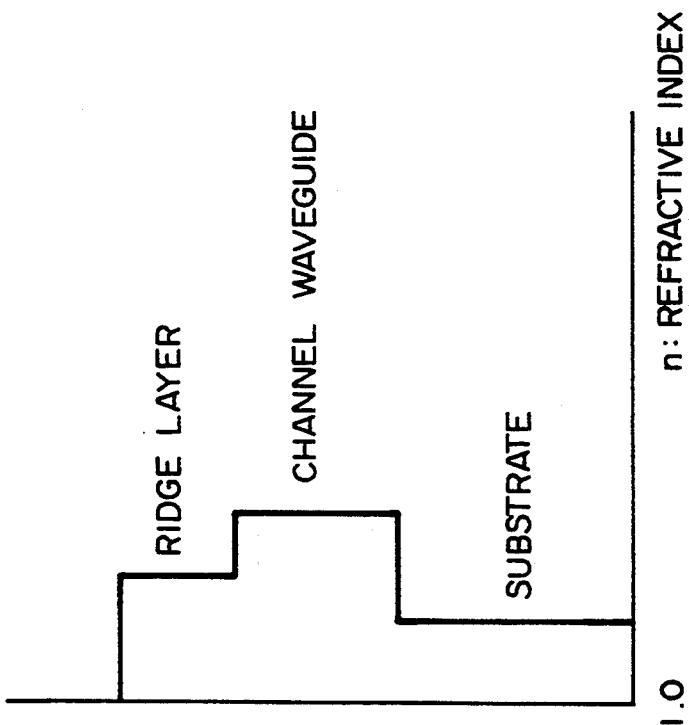
FIGS. 4A and 4B show changes in refractive indices at the respective layers of the second harmonic generating elements of FIGS. 2A and 2B, respectively.
Figure 4A:
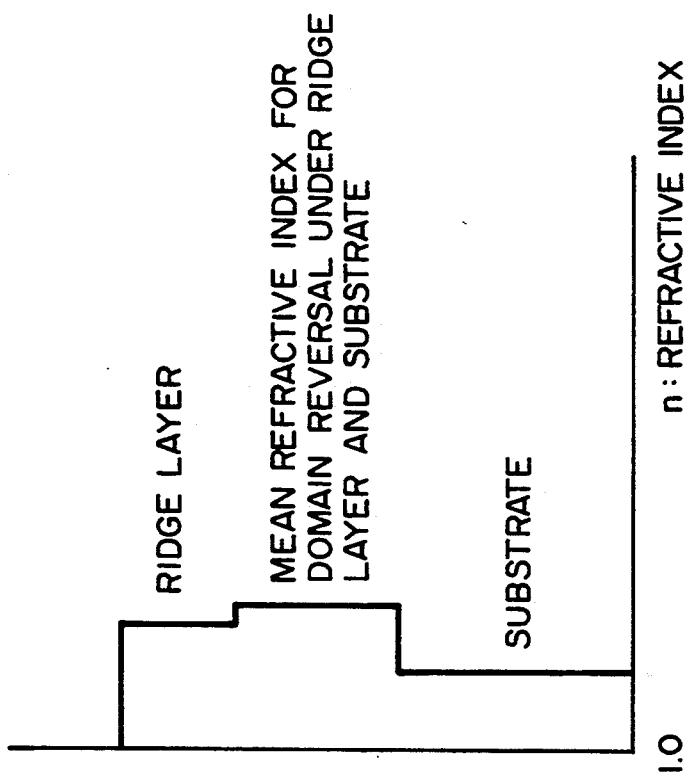
Figure 5:
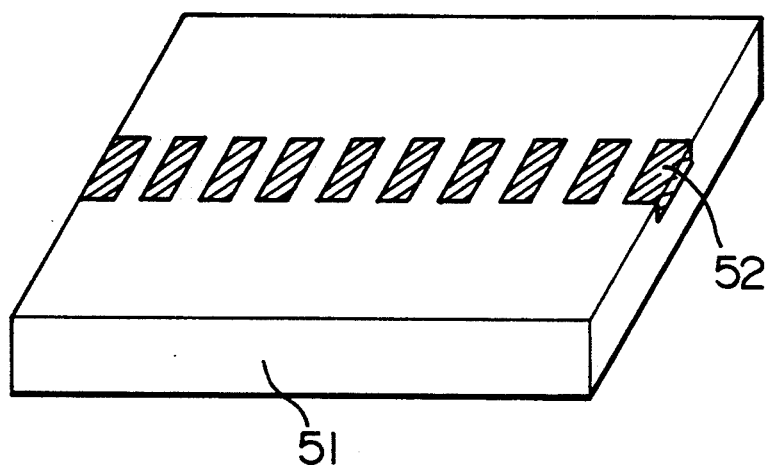
FIGS. 5 and 6 are perspective views showing structures of prior art second harmonic generating elements.
Figure 6:
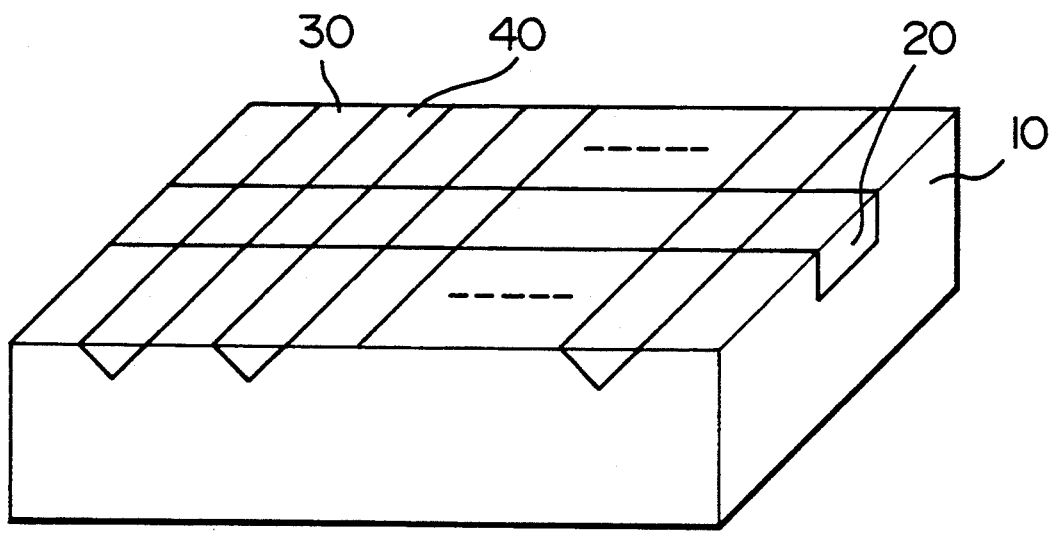

In the present embodiment, an efficiency of transforming an incident light to a secondary harmonic is improved by increasing an integrated value $\{S(n,n,m)\}$ of the formula (2) by providing the ridge portion. As shown in FIGS. 4A and 4B, the refractive index is changed at a portion including the ridge layer and the channel waveguide by providing the ridge layer. As a result, as shown in FIG. 3, the electric field distribution of the fundamental wave f($\omega$) is almost the same as that of the second harmonic f(2$\omega$) at the channel waveguide 82, but the former is different from the latter at the ridge portion 81 so that the cancellation of the electric field is reduced thereby increasing the value of S(n,n,m) and improving the transform efficiency.

The spontaneous polarization areas and the first channel waveguide in the second embodiment are identical to the spontaneous polarization reversal areas and the optical waveguide of the first embodiment, and they are manufactured in a similar process. The ridge optical waveguide 5 is manufactured after the formation of the spontaneous polarization reversal areas 2 in the embodiment of FIG. 2A, and manufactured after the formation of the spontaneous polarization reversal areas 2 and the first channel waveguide 4 in the embodiment of FIG. 2B. A thickness of the ridge optical wavelength is approximately 0.1–2 $\mu$m and a width thereof is approximately 2–10 $\mu$m (substantially equal to a width of the first channel waveguide).

In manufacturing the ridge optical waveguide, the ridge layer is formed by making a hole in a resist perpendicularly to the spontaneous polarization line by a photo-lithography technique, applying a thin film, whose refractive index is adjusted by SiO$_2$ mixed with Ta$_2$O$_5$ at a ratio of 0–100 weight %, by an RF sputtering method, and removing the resist to form the structure shown in FIG. 2A.

In the present embodiment, the molten salt of nitrate or acetate of rubidium and/or barium is used to locally reverse the polarization of the KTP single-crystal. However, when this method is used to reverse the polarization, a difference appeared in the refractive index between the ion-exchanged area and the non-exchanged area. Thus, in designing and manufacturing the SHG element, it is necessary to calculate the width of the polarization reversal area by taking the small difference between the refractive indices into consideration.

In a third embodiment of the present invention, the ion exchange is effected by using a molten salt of a mixture of potassium and barium so that the polarization reversal is achieved without presenting a difference between the refractive indices.

In the third embodiment, the polarization reversal areas are formed with the same refractive index as that of the non-reversal areas so that the design of element including a transfer error of a mask pattern in the manufacture of the element is simplified and more accurate element can be manufactured. By forming the channel waveguide normally to the stripe-type polarization reversal areas, the SHG element which is free from a scatter loss and has a high transform efficiency is manufactured.

The SHG element of the third embodiment has a structure similar to that of the element of FIG. 1. Resist is spin-coated on a minus z-plane of a KTP single-crystal substrate 1, and the resist is formed in comb-like or stripe pattern by the photo-lithography technique. The areas appear every 4 $\mu$m. The resist is removed after Ti sputtering to form a Ti pattern. It is immersed in a molten salt (300°–450° C.) of a mixture of potassium nitrate and barium nitrate mixed at a ratio of 80/20 (other salt may be used) for 10 minutes to 4 hours thereby to form alternately polarization non-reversal areas and polarization reversal areas having the same refractive index as that of the substrate. The Ti pattern is then removed and a channel waveguide is formed orthogonally to the stripe pattern in the same manner as that described above by using a Ti mask and immersing it in a molten salt of rubidium, cesium or thallium. In this manner, the second harmonic generating element is manufactured.

The substrate may be immersed in a molten salt (300°–450° C.) of mixture of rubidium nitrate and barium nitrate mixed at a ratio of 80/20 (or other salt may be used) for 10 minutes to 4 hours, instead of the molten salt of the mixture of potassium nitrate and barium nitrate, thereby to form alternately the polarization non-reversal areas and the polarization reversal areas. Then, it is immersed in a molten salt (300°–450° C.) of potassium nitrate for 10 minutes to 4 hours to exchange the rubidium ions with potassium ions. Then, the Ti pattern is removed and a channel waveguide is formed orthogonally to the stripe pattern in the same manner as that described above by using a Ti mask and immersing it in a molten salt of rubidium, cesium or thallium. In this manner, a light wavelength transform element is manufactured.

In the present embodiment, nitrate is used although other salt may be used. As the ratio of barium salt in the mol ratio of potassium salt and the barium salt increases, the time of polarization reversal is shortened. Magnesium salt calcium salt or strontium salt may be used instead of barium salt. While the Ti mask is used, a mask pattern forming metal such as Al, Ta, Ni, Cr or an alloy thereof may be used depending on the type of salt used.

TABLE 2

| Example | |
|---|---|
| Fundamental wave wavelength | 850 nm |
| Fundamental wave power | 10 mW |
| Second harmonic power | 1 μW |
| Comparative Example (Segment type: FIG. 2) $RbNO_3:Ba(NO_3)_2 = 80/20$ | |
| Fundamental wave wavelength | 857 nm |
| Fundamental wave power | 10 mW |
| Second harmonic power | 0.9 μW |

As seen from Table 2, essentially identical characteristic is attained. Both element lengths are 5 mm. An equivalent refractive index attained when it was immersed in a molten salt (350° C.) of a mixture of potassium nitrate and barium nitrate at a ratio of 80/20 for 10 minutes is shown in Table 3.

TABLE 3

| Change of Refractive Index | |
|---|---|
| Before ion-exchange | 1.861 |
| After ion-exchange | 1.861 |

Magnesium salt, calcium salt or strontium salt may be used instead of barium salt. While Ti mask is used, a metallic material such as Al, Ta, Ni, Cr or an alloy thereof may be used for making the mask pattern depending on the type of salt used.

In accordance with the present embodiment, the comb-like mask pattern is formed by the Ti metal on the minus z-plane of the KTP crystal, and the ion exchange is effected by immersing it in the molten salt of the mixture of potassium and barium to form alternately the polarization non-reversal areas and the polarization reversal areas which have the same refractive index as that of the substrate. The consideration to the difference of refractive index between the polarization non-reversal areas and the polarization reversal areas in the manufacture of the element and the design of the element including the transfer error of the mask pattern are simplified, and more accurate second harmonic generating element can be manufactured.

What is claimed is:

1. An optical waveguide second harmonic generating element comprising:
   a KTP single-crystal substrate sliced at a z-plane:
   a plurality of polarization reversal areas periodically formed in a predetermined direction on the z-plane of said substrate, said polarization reversal areas having reversed directions of spontaneous polarization; and
   a channel waveguide extending along said direction across said plurality of polarization reversal areas for propagating a light,
   wherein said channel waveguide includes a first waveguide having a larger refractive index than that of said substrate for propagating the light, and a second ridge waveguide having a refractive index smaller than that of said first waveguide and larger than that of said substrate and extending parallel to said first waveguide for propagating a second harmonic of said light.

2. An optical waveguide second harmonic generating element according to claim 1 wherein said first waveguide and said second waveguide have substantially equal widths and are laminated in two-layer structure.

3. A method of manufacturing an optical waveguide second harmonic generating element comprising the steps of:
   forming a mask on a z-plane of a KTP single-crystal substrate by a selected metal material in a pattern having a plurality of areas arranged periodically along a predetermined direction, a surface of the substrate being exposed at the areas;
   applying to the exposed areas on the masked substrate an ion-exchange treatment thereby to form a plurality of polarization reversal areas periodically arranged along said predetermined direction, and removing said mask;
   forming a first optical waveguide on said substrate for propagating a light, said first optical waveguide extending along said predetermined direction across said areas, and
   forming a second ridge optical waveguide extending in parallel to said first optical waveguide for propagating a second harmonic of said light.

4. A method according to claim 3 wherein said first optical waveguide has a refractive index larger than that of said substrate, and said second optical waveguide has a refractive index smaller than that of said first optical waveguide and larger than that of said substrate.

5. A method according to claim 3 wherein said second optical waveguide is formed by a thin film including mixture of $SiO_2$ and $Ta_2O_5$.

6. A method of manufacturing a quasi-phase matched second harmonic generating element comprising the steps of:
   forming, on a minus z-plane of a KTP single-crystal substrate, a mask by a selected metal material in a pattern having a plurality of areas arranged periodically along a predetermined direction on said minus z-plane, a surface of the substrate being exposed at the areas;
   applying to the masked substrate a first thermal treatment in a molten salt of a mixture of salts of rubidium and barium to exchange potassium ions in the exposed areas to rubidium ions; and
   applying after said first thermal treatment to the masked substrate a second thermal treatment in a molten salt including potassium thereby to exchange the rubidium ions to the potassium ions and to form a plurality of polarization reversal areas and polarization non-reversal areas alternately arranged along said predetermined direction, said polarization reversal areas and said polarization non-reversal areas having substantially equal refractive indices.

7. A method according to claim 6 further comprising a step of forming a channel waveguide extending across the alternately arranged polarization reversal areas and polarization non-reversal areas.

* * * * *